United States Patent [19]
Juang

[11] Patent Number: 5,466,098
[45] Date of Patent: Nov. 14, 1995

[54] DRILL BIT GUIDING DEVICE

[76] Inventor: Bor-Chang Juang, No. 3, Lane 14, Chen-Hsing Rd., Tai Ping Hsiang, Taichung Hsien, Taiwan

[21] Appl. No.: 343,720

[22] Filed: Nov. 21, 1994

[51] Int. Cl.⁶ .................................................. B23B 47/28
[52] U.S. Cl. ...................................... 408/115 R; 408/103
[58] Field of Search ............................ 408/97, 103, 108, 408/115 R, 115 B

[56] References Cited

U.S. PATENT DOCUMENTS

| | | | |
|---|---|---|---|
| 2,602,238 | 7/1952 | Wellman | 408/108 |
| 5,308,199 | 5/1994 | Juang | 408/115 R |
| 5,409,329 | 4/1995 | Juang | 408/115 R |

FOREIGN PATENT DOCUMENTS 2071537  9/1981  United Kingdom ............... 408/115 R

*Primary Examiner*—Daniel W. Howell
*Attorney, Agent, or Firm*—Knobbe, Martens, Olson & Bear

[57] ABSTRACT

A drill bit guiding device includes an end block, a mounting block, a pair of parallel guide rods between the end block and the mounting block, a slide member and a pushing screw. The end block has a flat end face and a plurality of through-holes formed perpendicularly through the flat end face. The slide member is mounted between the end block and the mounting block and integrally has a first portion passed perpendicularly through by the guide rods, and a second portion disposed parallel to the guide rods. The slide member further has a plurality of through-holes formed through the second portion, each corresponding to a respective one of the through-holes of the end block, and an axis transverse to an axis of the corresponding one of the through-holes in the end block. The pushing screw passes threadedly and perpendicularly through the mounting block and has a first end portion provided with an abutting member which moves towards or away from the slide member upon rotation of the pushing screw.

10 Claims, 8 Drawing Sheets

DRILL BIT GUIDING DEVICE

BACKGROUND OF THE INVENTION

1. Field of the Invention

The invention relates to a guiding device, more particularly to a drill bit guiding device which is used to guide the formation of holes in a wooden workpiece.

2. Description of the Related Art

Drill bit guiding devices are used when it is desired to form holes in a wooden workpiece accurately. Referring to FIG. 1, a conventional drill bit guiding device 1 includes a substantially U-shaped member with two spaced parallel portions 101, 105 and a connecting portion 102 which integrally interconnects the parallel portions 101, 105. The parallel portion 101 is formed with three threaded through-holes 103 and three indicating lines 107, while the connecting portion 102 is also formed with three threaded through-holes 103 which correspond respectively to the through-holes 103 of the parallel portion 101. The parallel portion 105 is provided with a retaining bolt 106 which passes threadedly therethrough. Each of the threaded through-holes 103 receives removably a tubular guide wall 104 therein to prevent damage to the threaded through-holes 103 during the boring operation of holes through the wooden workpiece.

Referring to FIG. 2, when it is desired to bore a hole A2 through a side surface A1 or a hole A3 adjacent to the side surface A1 of a wooden workpiece (A), the workpiece (A) is placed below the parallel portion 101 of the conventional guiding device 1 with the surface A1 abutting against the connecting portion 102. The retaining bolt 106 is rotated inwardly so as to clamp the workpiece (A). A drill bit (not shown) is inserted axially of the tubular guide wall 104 as shown by the arrow F1 or F2, thereby forming the hole A2 or A3 in the workpiece (A).

When it is to form a hole A2 or A3 in another workpiece to permit connection with the former workpiece by means of dowel pin, an indicating line which is aligned with one of the indicating lines 107 on the parallel portion 101 must be drawn on the surface A4 of said another workpiece.

Note that only one workpiece can be drilled at one time the conventional drill bit guiding device 1 is in use. Since the indicating line on the surface A4 of said another workpiece is drawn manually after boring the hole A2 in the former workpiece, the indicating line on said another workpiece may be mis-aligned with the axis of the hole A2 of the former workpiece, thereby resulting in an improper connection between two workpieces when the latter are connected to each other by means of the dowel pin.

FIG. 3 shows another conventional drill bit guiding device 5 which includes two parallel portions 204, a connecting portion 206 which interconnects the parallel portions 204 and a protrusion 201 which extends from the connecting portion 206 in the same direction as the parallel portions 204. Each of the parallel portions 204 is provided with a retaining bolt 205 which passes threadedly and perpendicularly therethrough. The connecting portion 206 is provided with a plurality of through-holes 202 which receive a respective tubular guide wall 203 therein. The conventional drill bit guiding device 5 can clamp two workpieces (A) at one time so that holes A2 can be bored through the side surface A1 of the workpieces A. The conventional drill bit guiding device 5, however, cannot be used to bore holes adjacent to the side surface A1.

SUMMARY OF THE INVENTION

Therefore, the object of the present invention is to provide a drill bit guiding device which can hold two workpieces simultaneously for boring of holes in the workpieces such that the holes in one of the workpieces correspond with the holes in the other one of the workpieces so as to permit proper connection of the workpieces in a parallel or perpendicular manner.

More specifically, the object of the present invention is to provide a drill bit guiding device which can be used to guide the forming of holes in desired locations, such as adjacent to the side surfaces, of two wooden workpieces.

Accordingly, a drill bit guiding device for guiding axial movement of a drill bit includes an end block, a pair of guide rods, a mounting block, a slide member and a pushing screw. The end block has a flat end face and a plurality of through-holes which are formed therethrough and which extend respectively and perpendicularly to the flat end face. Each of the guide rods has a first end portion mounted perpendicularly to the flat end face of the end block and a second end portion connected perpendicularly to the mounting block so as to retain the guide rods between the end block and the mounting block. The slide member is disposed between the end block and the mounting block and integrally has a first portion which is passed through perpendicularly by and which is slidable along the guide rods, and a second portion which is disposed parallel to the pair of guide rods. The slide member further has a plurality of through-holes formed through the second portion. Each of the through-holes in the second portion corresponds with a respective one of the through-holes of the end block and further has an axis transverse to an axis of the corresponding one of the through-holes in the end block. The pushing screw passes threadedly and perpendicularly through the mounting block and has a first end portion provided with an abutting member which moves towards or away from the slide member upon rotation of the pushing screw.

In the disclosed embodiment, the end block is preferably an L-shaped member having a longer portion with the flat end face thereon and a shorter portion which extends perpendicularly from a peripheral edge of the flat end face on the longer portion and parallel to the second portion of the slide member. The plurality of through-holes of the end block are of different diameters and extend in a row parallel to the shorter portion. The slide member is preferably a T-shaped piece with the first portion connected perpendicularly to an intermediate section of the second portion. The plurality of through-holes which are formed through the second portion of the slide member comprises a first row of through-holes of different diameters which are disposed in one side of the first portion, and a second row of through-holes of different diameters which are disposed in the other side of the first portion and which correspond to the first row.

The drill bit guiding device of the present invention further comprises a clamp for clamping two workpieces which are to be provided on both sides of the first portion of the slide member so as to be clamped thereat by the end block and the abutting member of the pushing screw. The clamp is an E-shaped clamp with two outer flanges which extend in a parallel manner in a same direction and an intermediate protrusion which has a thickness substantially equal to that of the first portion of the slide member and which extends between the two outer flanges in the same direction. Each of the outer flanges further has a retaining bolt which extends threadedly and perpendicularly therethrough so as to dispose a first end of the retaining bolt between one of the outer flanges and the intermediate protrusion and so as to dispose a second end of the retaining bolt exteriorly of the E-shaped clamp. The first end of the retaining bolt is provided with an abutting disc while the second end of the retaining bolt is provided with a knob.

In addition, each of the through-holes of the L-shaped end block and the slide member preferably receives a tubular guide wall therein in order to prevent damage thereto during a boring operation of holes in the workpieces.

BRIEF DESCRIPTION OF THE DRAWINGS

Other features and advantages of the present invention will become more apparent in the following detailed description of the preferred embodiment, with reference to the accompanying drawings, of which.

DETAILED DESCRIPTION OF THE PREFERRED EMBODIMENT

Figure 1:
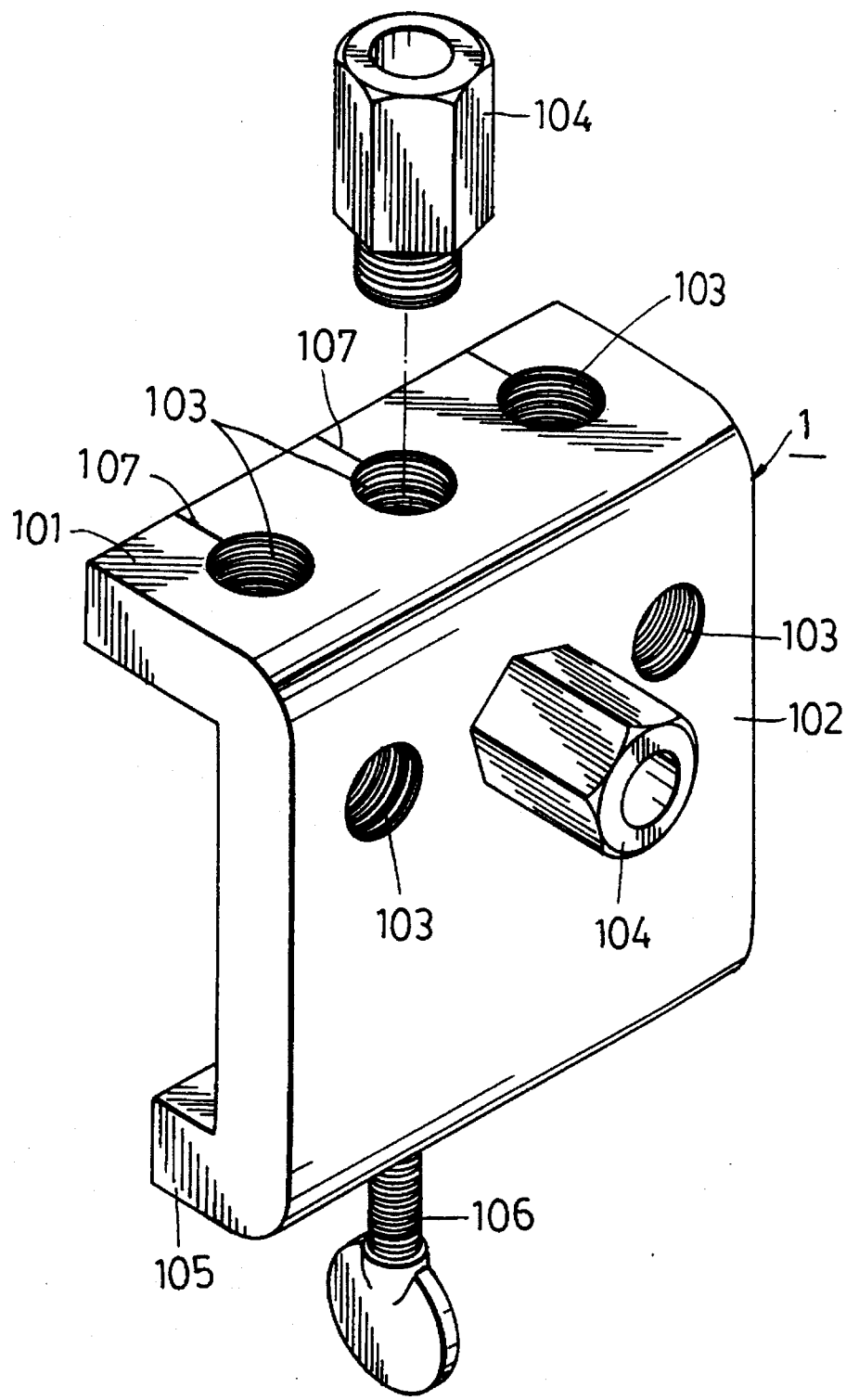
FIG. 1 shows a conventional drill bit guiding device.
Figure 2:
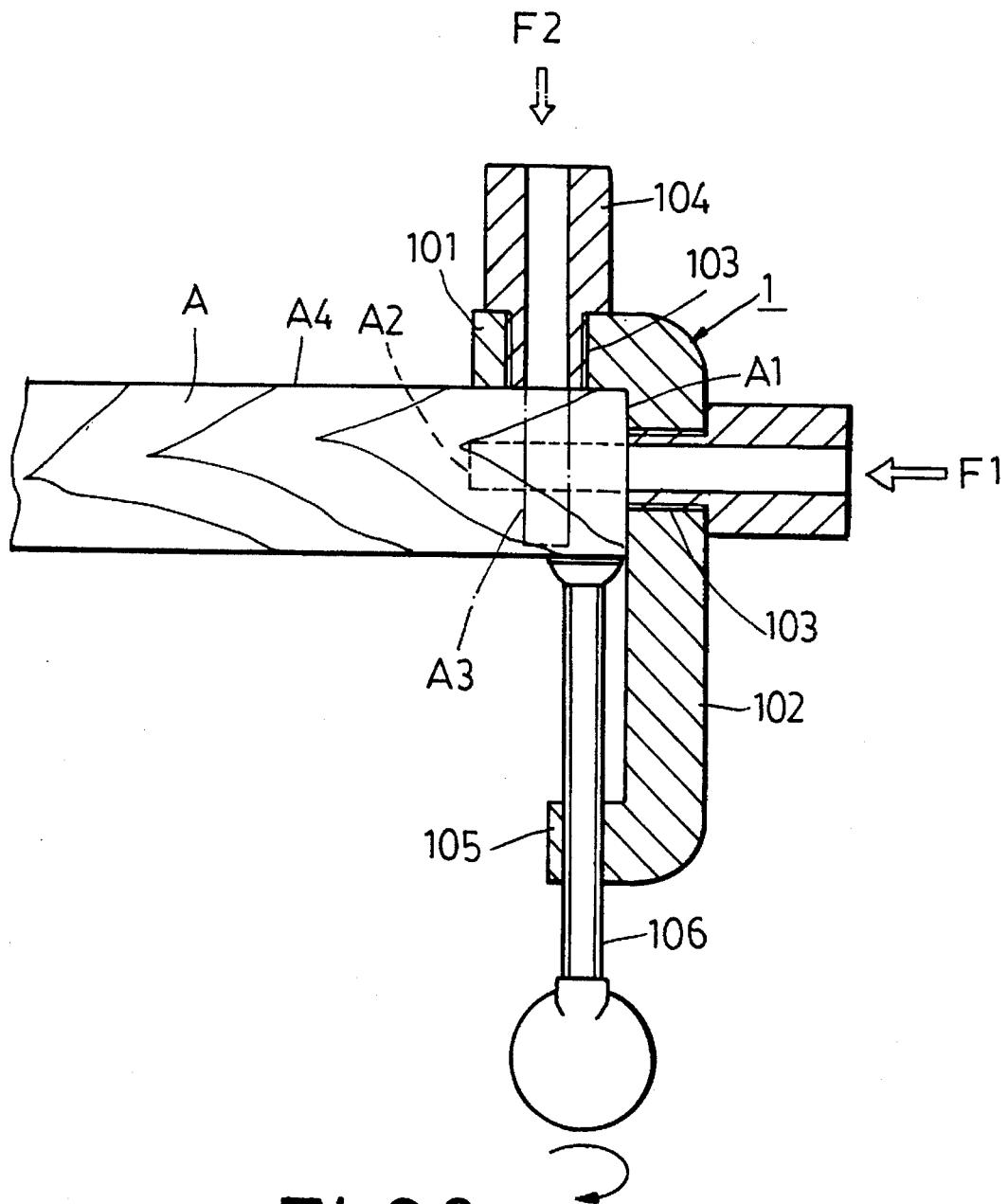
FIG. 2 shows the conventional drill bit guiding device of FIG. 1 when clamping a workpiece for forming holes therein.
Figure 3:
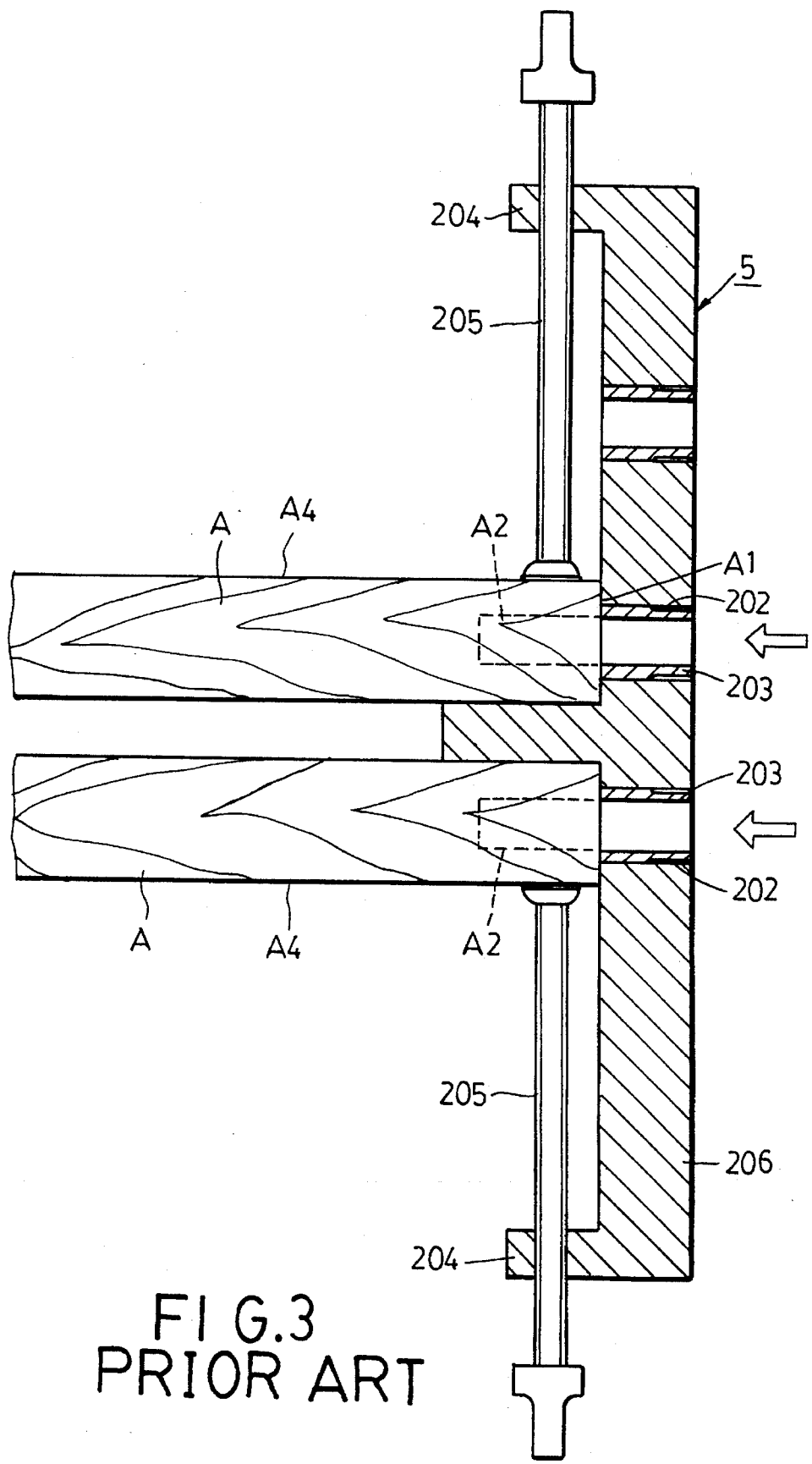
FIG. 3 shows another conventional drill bit guiding device when clamping two workpieces for forming holes therein.
Figure 4:
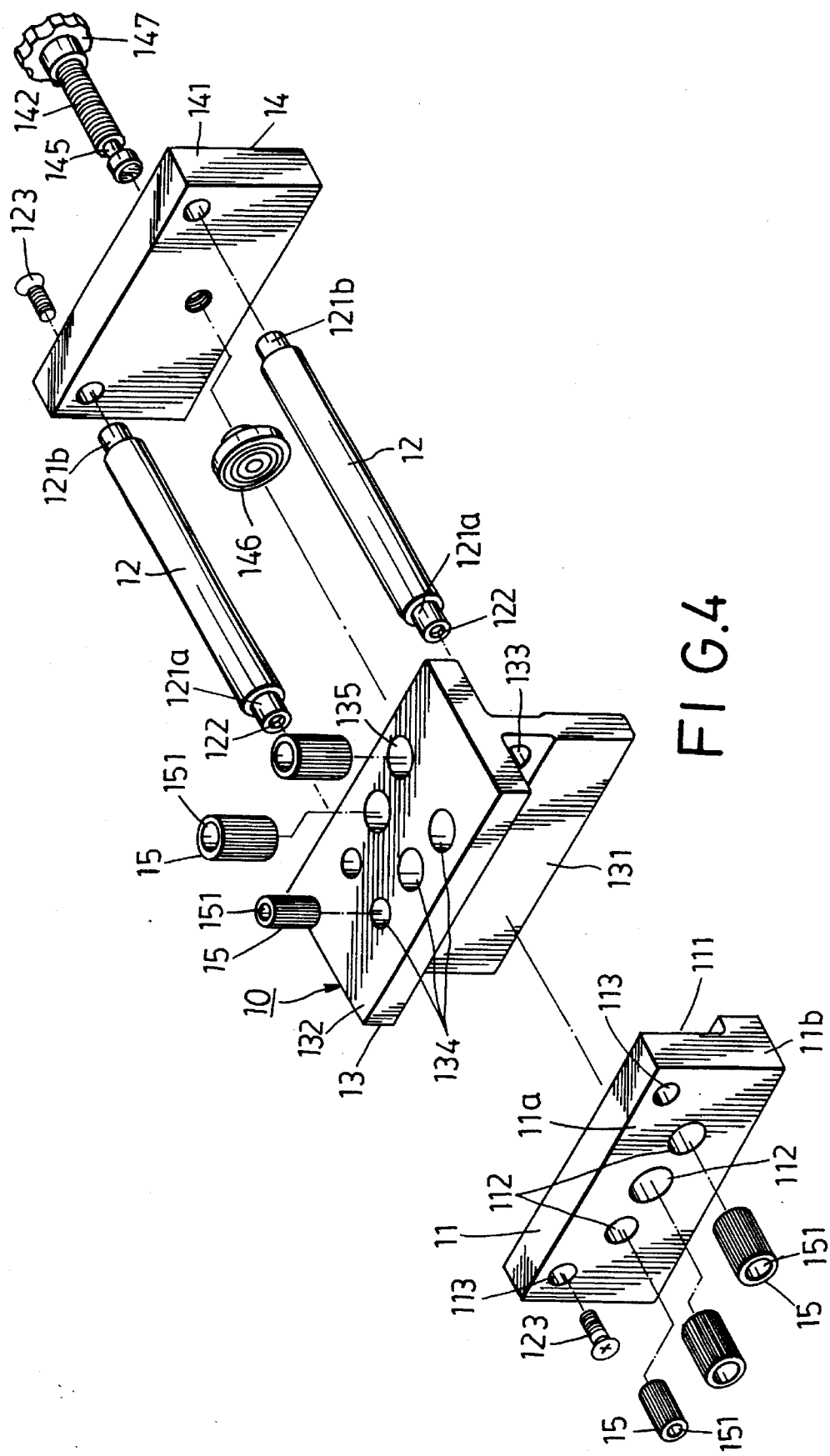
FIG. 4 shows an exploded view of a drill bit guiding device of the present invention.

Referring to FIG. 4, an exploded view of a drill bit guiding device of the present invention is shown to comprise an L-shaped end block 11, a T-shaped slide member 13, a pair of guide rods 12, a mounting block 14 and a pushing screw 142.

The L-shaped end block 11 has a longer portion 11a with a flat end face 111 and a shorter portion 11b which extends perpendicularly from a peripheral edge of the flat end face 111 of the longer portion 11a. The longer portion 11a of the end block 11 further has a row of through-holes 112 of different diameters which are formed therethrough, which extend respectively and perpendicularly to the flat end face 111 and which are parallel to the shorter portion 11b. Each of the guide rods 12 has a restricted first end portion 121a with internally threaded holes 122 inserted respectively into two through-holes 113 formed perpendicularly to the flat end face 111 and through the longer portion 11a of the end block 11. Two countersunk-head bolts 123 pass through the longer portion 11a and are threaded in the internally threaded holes 122 of the guide rods 12. Thus, the guide rods 12 extend in a parallel manner from the longer portion 11a of the end block 11. The second end portions 121b of the guide rods 12 pass perpendicularly through the mounting block 14 and are fastened thereat by another pair of countersunk-head bolts 123. The guide rods 12 are, therefore, retained between the end block 11 and the mounting block 14.

The T-shaped slide member 13 has a first portion 131 which are passed perpendicularly through by and which is slidable along the guide rods 12, and a second portion 132 with an intermediate portion which is connected integrally and perpendicularly to the first portion 131 of the slide member 13 so that the second portion 132 is located parallel to the guide rods 12. The second portion 132 of the slide member 13 is provided with a plurality of through-holes which comprises a first row of through-holes 134 of different diameters disposed at one side of the first portion 131 and a second row of through-holes 135 of different diameters disposed on the other side of the first portion 131. The through-holes 134, 135 in the second portion 132 of the slide member 13 correspond to the through-holes 112 in the end block 11 and respectively have an axis transverse to an axis of the corresponding one of the through-holes 112 in the L-shaped end block 11. The pushing screw 142 passes threadedly and perpendicularly through the mounting block 14 and has a first end portion 145 which is provided with an abutting member 146 and a second end portion of the pushing screw 142 which is disposed exteriorly of the mounting block 14 and which is provided with a turning knob 147. In order to prevent damage to the through-holes 112, 134, 135 formed through the end block 11 and the slide member 13, each of the through-holes 112, 134, 135 is provided removably with a tubular guide wall 15 which confines a hole 151 therein for guiding axial movement of a drill bit during the boring operation of holes in the workpieces.

Figure 6:
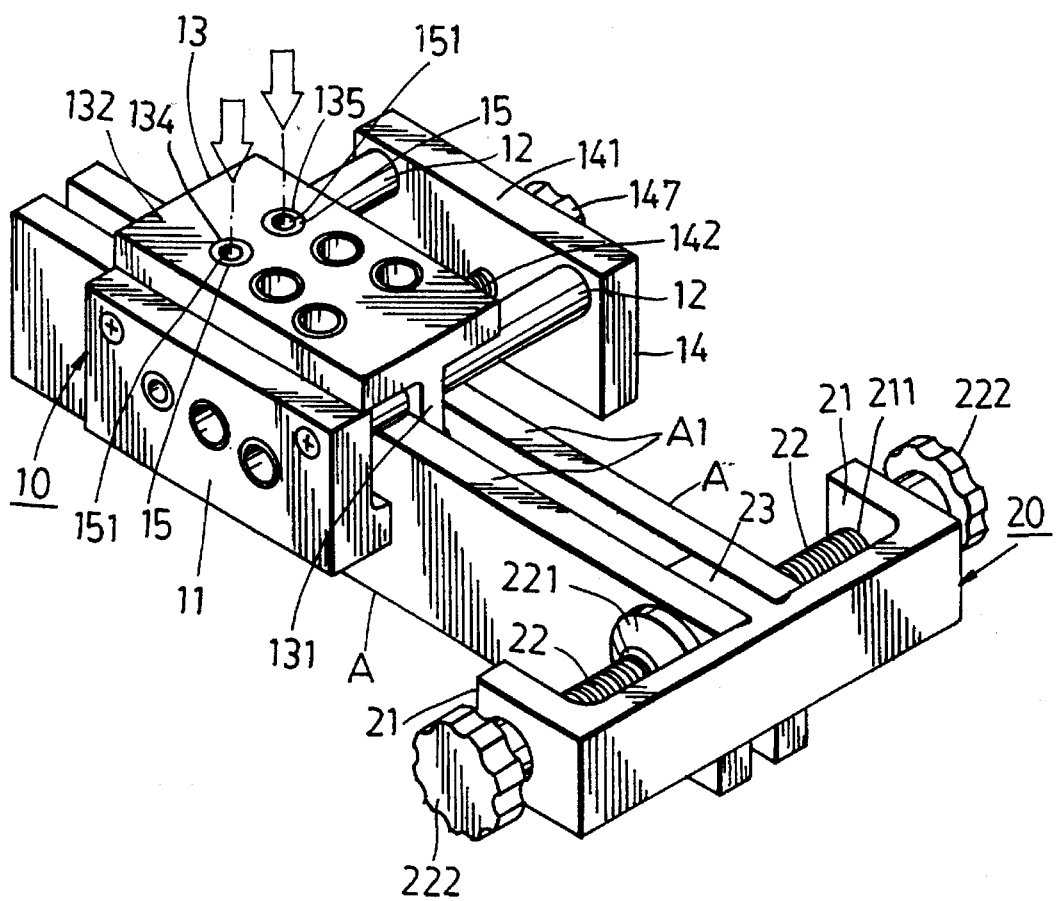
FIG. 6 shows a perspective, schematic view of the drill bit guiding device of the present invention to illustrate the forming of holes in one side surface of the workpieces.

Referring to FIG. 6, the drill bit guiding device of the present invention further includes an E-shaped clamp 20 with two outer flanges 21 which extend in a parallel manner in a same direction, and an intermediate protrusion 23 which has a thickness substantially equal to that of the first portion 131 of the slide member 13 and which extends between the two outer flanges 21 in the same direction. Note that each of the outer flanges 21 is further provided with a retaining bolt 22 which extends threadedly and perpendicularly therethrough so as to dispose a first end of the retaining bolt 22 between one of the outer flanges 21 and the intermediate protrusion 23 and so as to dispose a second end of the retaining bolt 22 exteriorly of the E-shaped clamp 20. The first end of the retaining bolt is provided with an abutting disc 221 while the second end of the retaining bolt 22 is provided with a knob 222.

Two workpieces (A) are first clamped by the E-shaped clamp 20 and are later provided on both sides of the first portion of the slide member 13. The slide member 13 can thus slide along the surface (A1) of the workpieces (A). When it is desired to bore a hole with a certain diameter in the surface (A1) of the workpieces (A), the pushing screw 142 is rotated inwardly so as to clamp the workpieces (A) by means of the flat end face 111 of the end block 11 and the abutting member 146 of the pushing screw 142. Thus, holes of different diameters can be bored in desired locations on the surface A1 of the workpieces (A).

Figure 5:
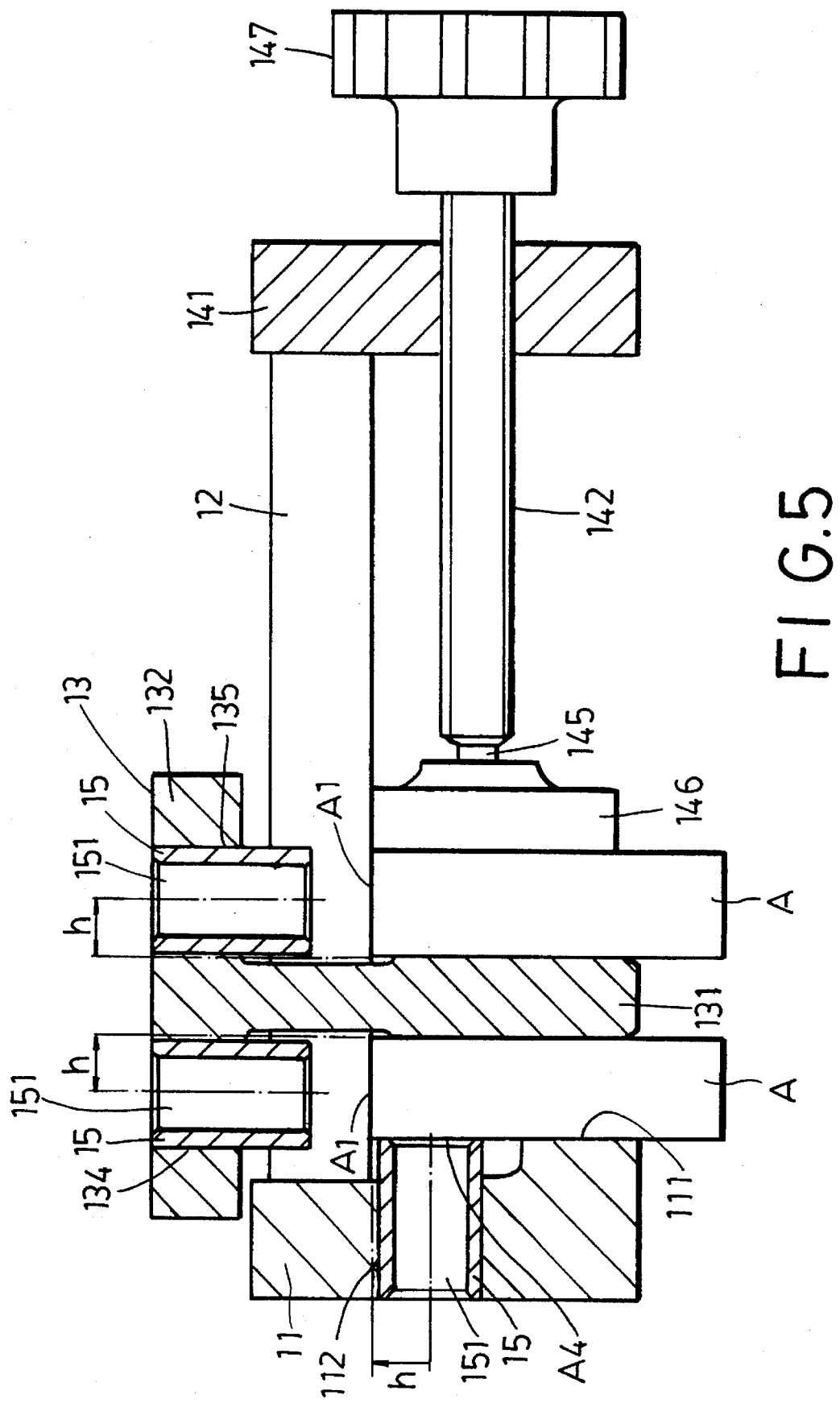
FIG. 5 shows a cross sectional view of the drill bit guiding device of the present invention when clamping two workpieces.

Referring to FIG. 5, note that the through-holes 134, 135 which are formed through the second portion 132 of the slide member 13 respectively have axes which are spaced equally by a predetermined distance (h) from two opposed flat surfaces of the first portion 131 of the slide member 13. The through-holes 112 which are formed through the longer portion 11a of the end block 11 respectively have axes which form cooperatively a plane parallel to a plane constituted by the guide rods 12 and which are spaced by the same distance (h).

Figure 7:
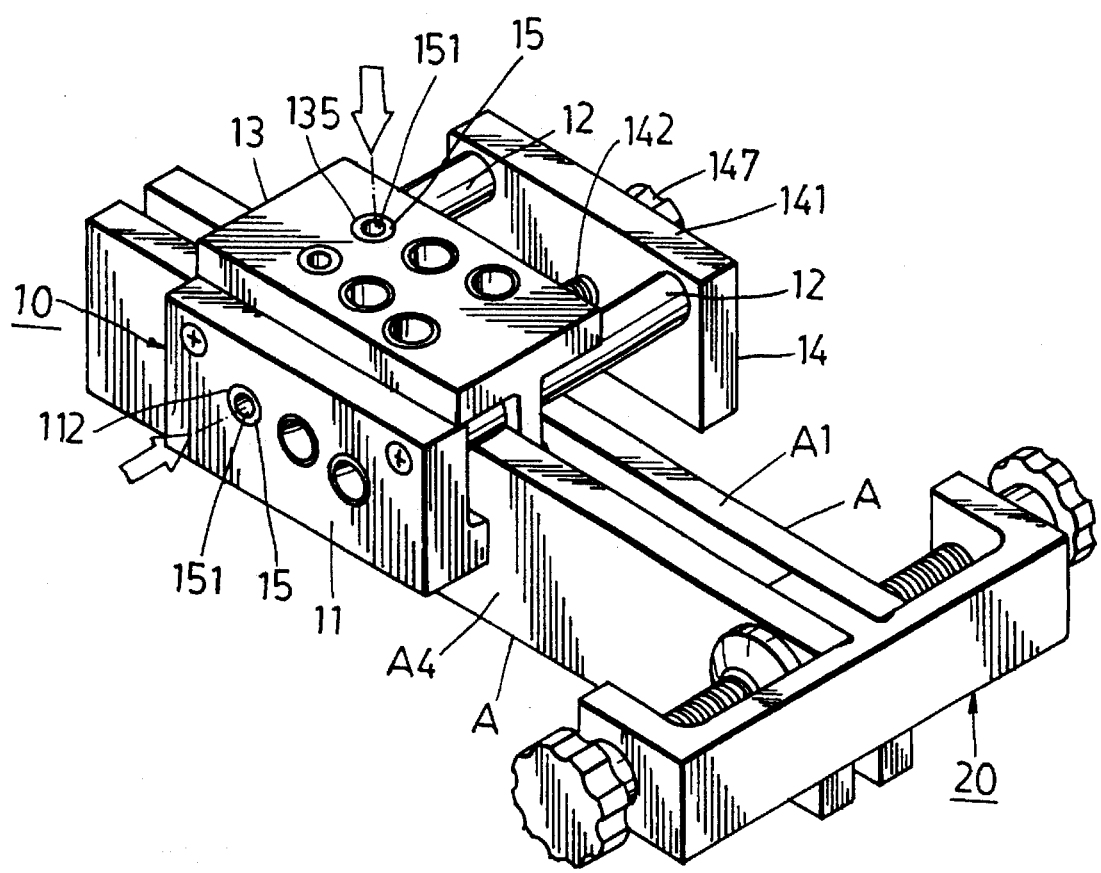
FIG. 7 shows a perspective, schematic view of the drill bit guiding device of the present invention to illustrate the forming of holes in two side surfaces of the workpieces.
Figure 8:
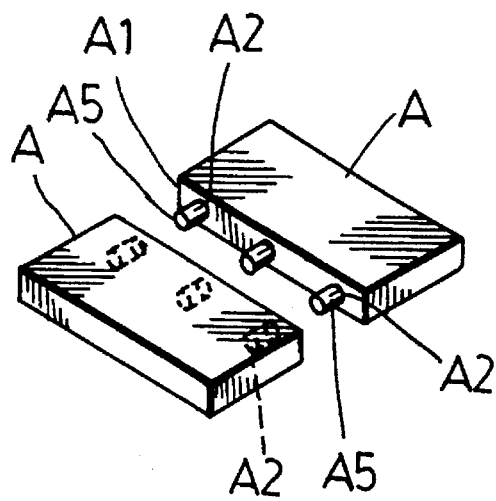
FIGS. 8 and 9 shows two connecting methods between two workpieces that are formed with holes by the use of the drill bit guiding device of the present invention.
Figure 9:
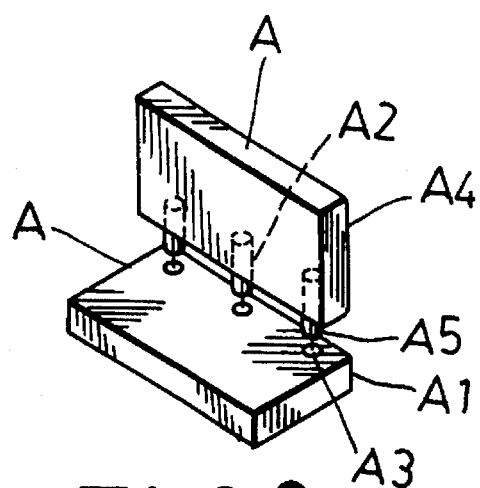

Referring to FIG. 7, when it is desired to bore holes A2 of a certain diameter on the surfaces A1 of two identical workpieces (A), the drilling operation can be done as shown by the arrows in FIG. 6 without the need for drawing an indicating line on one of the workpieces (A). Thus, after forming the holes A2 in the surfaces A1 of two identical workpieces (A), the identical workpieces (A) can be connected to each other at an exact position by the use of dowel pins A5 under the condition that the top surfaces of the workpieces (A) are flush with each other, as shown in FIG. 8. Similarly, after the formation of holes A2 in one of the workpieces (A) and holes A3 in the other one of the workpieces (A), as shown by the arrows in FIG. 7, the two identical workpieces (A) can be connected to each other by the use of dowel pins A5, as shown in FIG. 9 under the condition that the side surfaces A1, A4 of the identical workpieces (A) are flush with each other.

With the invention thus explained, it is obvious to those skilled in the art that various modifications and variations can be done without departing from the scope and spirit of this invention. It is therefore intended that this invention be limited only as in the appended claims.

I claim:

1. A drill bit guiding device for guiding axial movement of a drill bit, comprising:

an end block having a flat end face and a plurality of through-holes which are formed through said end block and which extend respectively and perpendicularly to said flat end face;

a pair of guide rods, each having a first end portion mounted perpendicularly to said flat end face of said end block and a second end portion;

a mounting block mounted perpendicularly to said second end portions of said guide rods, thereby retaining said pair of guide rods between said end block and said mounting block;

a slide member mounted between said end block and said mounting block and integrally having a first portion being passed perpendicularly through by and which is slidable along said pair of guide rods, and a second portion disposed parallel to said pair of guide rods, said slide member further having a plurality of through-holes formed through said second portion, each of said through-holes in said second portion corresponding with a respective one of said through-holes in said end block and further having an axis transverse to an axis of said corresponding one of said through-holes in said end block; and a pushing screw passing threadedly and perpendicularly through said mounting block and having a first end portion provided with an abutting member which moves towards or away from said slide member upon rotation of said pushing screw.

2. The drill bit guiding device as defined in claim 1, wherein said plurality of through-holes of said end block are of different diameters and extend in a row.

3. The drill bit guiding device as defined in claim 2, wherein said slide member is a T-shaped piece with said first portion connected perpendicularly to an intermediate section of said second portion, said plurality of through-holes formed through said second portion comprises a first row of through-holes of different diameters disposed at one side of said first portion.

4. The drill bit guiding device as defined in claim 3, wherein said plurality of through-holes formed through said second portion further comprises a second row of through-holes of different diameters disposed on the other side of said first portion and corresponding to said first row of said through-holes.

5. The drill bit guiding device as defined in claim 4, further comprising a clamp for clamping two workpieces which are to be provided on both sides of said first portion of said slide member so as to be clamped thereat by said end block and said abutting member of said pushing screw.

6. The drill bit guiding device as defined in claim 5, wherein said clamp is an E-shaped clamp with two outer flanges extending in a parallel manner in a same direction and an intermediate protrusion with a thickness substantially equal to that of said first portion of said slide member, said protrusion extending between said two outer flanges in said same direction, each of said outer flanges further having a retaining bolt extending threadedly and perpendicularly therethrough and disposing a first end of said retaining bolt between one of said outer flanges and said intermediate protrusion and a second end of said retaining bolt exterior of said E-shaped clamp, said first end of said retaining bolt being provided with an abutting disc, said second end of said retaining bolt being provided with a knob.

7. The drill bit guiding device as defined in claim 6, wherein each of said through-holes of said end block and said slide member receives a tubular guide wall therein for guiding axial movement of a drill bit therethrough.

8. The drill bit guiding device as defined in claim 1, wherein said end block is an L-shaped member having a longer portion with said flat end face formed thereon and a shorter portion which extends perpendicularly from a peripheral edge of said flat end face on said longer portion and parallel to said second portion of said slide member, said row of through-holes being formed through said longer portion and extending parallel to said shorter portion.

9. The drill bit guiding device as defined in claim 8, wherein said through-holes of said L-shaped member respectively have axes which constitute a plane parallel to a plane constituted by said guide rods and which are spaced by a predetermined distance therefrom.

10. The drill bit guiding device as defined in claim 9, wherein said first portion of said slide member has opposed flat faces respectively facing said flat end face of said L-shaped member and said mounting block, said through-holes of said second portion of said slide member respectively having axes spaced perpendicularly by a distance equivalent to said predetermined distance from said opposed flat side faces of said first portion of said slide member.

* * * * *